W. H. SAUVAGE.
SAFETY SIGNAL DEVICE FOR FLUID PRESSURE BRAKE SYSTEMS.
APPLICATION FILED JULY 5, 1910.

1,001,084.

Patented Aug. 22, 1911.
3 SHEETS—SHEET 1.

Attest:
W. J. McGuire
Ella J. Kruger

Inventor:
William H. Sauvage
by Redding, Greeley & Austin
Attys.

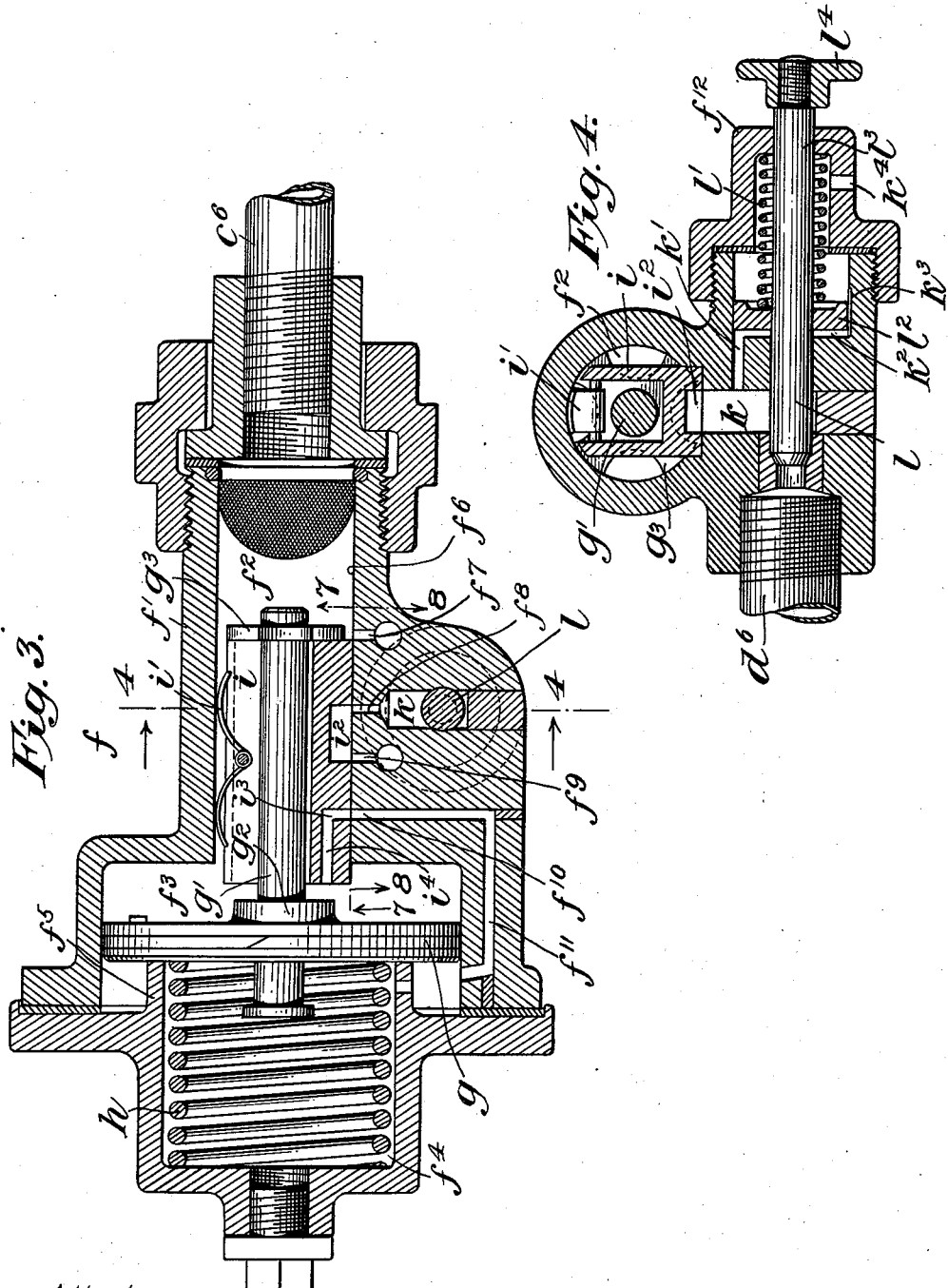

W. H. SAUVAGE.
SAFETY SIGNAL DEVICE FOR FLUID PRESSURE BRAKE SYSTEMS.
APPLICATION FILED JULY 5, 1910.
1,001,084.
Patented Aug. 22, 1911.
3 SHEETS—SHEET 3.
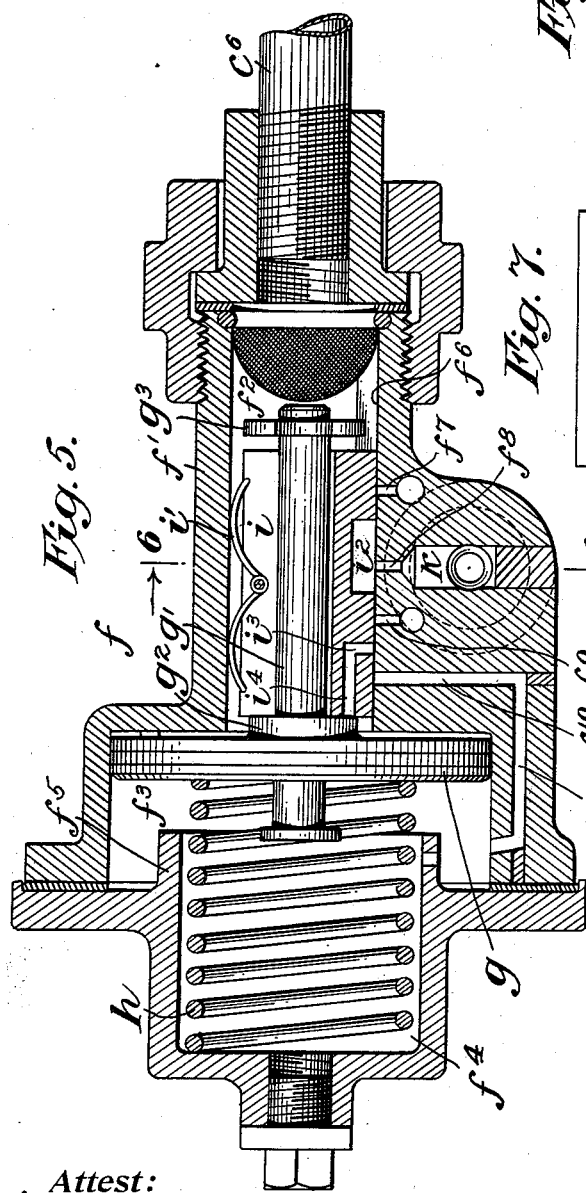
Attest:
Inventor:
William H Sauvage
by Redding, Greeley & Austin
Attys.

UNITED STATES PATENT OFFICE.

WILLIAM H. SAUVAGE, OF NEW YORK, N. Y.

SAFETY SIGNAL DEVICE FOR FLUID-PRESSURE-BRAKE SYSTEMS.

1,001,084.  Specification of Letters Patent.  Patented Aug. 22, 1911.

Application filed July 5, 1910. Serial No. 570,320.

*To all whom it may concern:*

Be it known that I, WILLIAM H. SAUVAGE, a citizen of the United States, residing in the borough of Manhattan of the city of New York, in the State of New York, have invented certain new and useful Improvements in Safety Signal Devices for Fluid-Pressure-Brake Systems, of which the following is a specification, reference being had to the accompanying drawings, forming a part hereof.

It has been proposed heretofore to provide devices whereby the engineer of a railway train shall be enabled at any time to test the condition of the air-brake system while running or at terminals and without actual application of the brakes and to determine with certainty whether the brake and signal system is in such condition as to permit the application of the brakes if necessary. For the most part such devices are so constructed and combined with the brake system and the cab whistle signal system that if the brake system is in proper working condition the cab signal sounds if the engineer shifts the engineer's valve momentarily from the running position to the release position. The signal will not sound if the brake system is not in condition for application of the brake either through obstruction of the train pipe, as by the careless or accidental closing of an angle cock, or through excessive leakage. The device itself forms a connection between the train pipe and the signal pipe and is usually placed on the rear car of the train. Wherever it may be placed in the train, it is intended to indicate to the engineer the condition of the brake system between the locomotive and the point at which the device is applied. Most of the devices heretofore proposed for the purpose described are more or less complicated in construction and in operation and therefore introduce a factor of unreliability.

It is the object of this invention to produce a device of exceedingly simple construction, having but few working parts, which shall be certain in operation under all conditions and shall not be liable to get out of order.

The invention will be more fully explained hereinafter with reference to the accompanying drawings in which it is illustrated and in which—

Figure 1:
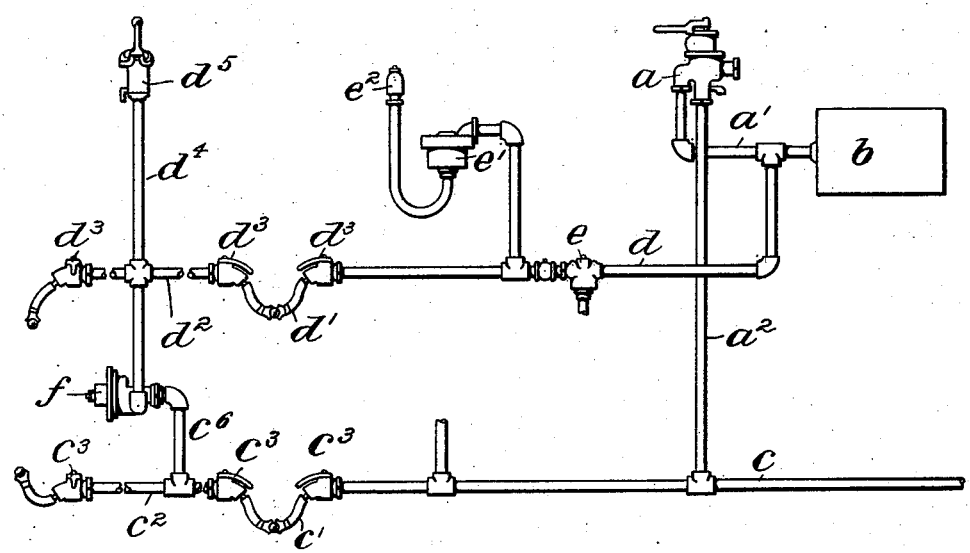
Figure 2:
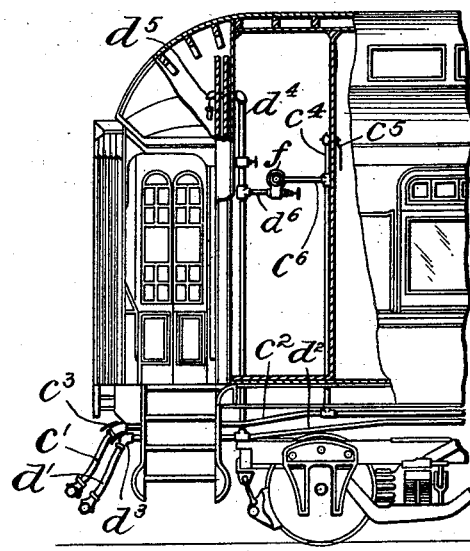

Figure 1 is a diagrammatic view showing the principal parts of a brake and signal system so far as they are involved in the operation of the improved device, the brakes themselves and their connections not being shown. Fig. 2 is a view, partly in elevation and partly broken out, of one end of a railway passenger car equipped with the improved device. Fig. 3 is a detail view in section of the improved device, the parts being shown in applied or testing position. Fig. 4 is a detail view in section on the plane indicated by the line 4—4 of Fig. 3. Figs. 5 and 6 are views similar to Figs. 3 and 4 respectively, the parts being shown in their normal or running positions, Fig. 6 being in section on the plane indicated by the line 6—6 of Fig. 5. Fig. 7 is an underside view of the slide valve shown in Figs. 5 and 6. Fig. 8 is a top view of a portion of the valve seat upon which the slide valve rests showing the arrangement of the ports therein, the same being represented as broken off on the line 7—8 of Fig. 3. Fig. 9 is a detail view of the plate on the end of the stem of the piston which operates the slide valve.

Referring first to the arrangement of usual parts of a fluid pressure system for railway brakes shown in Fig. 1, the engineer's valve $a$ is connected by a pipe $a'$ with an air tank $b$ and by a pipe $a^2$ with the train pipe $c$ through which the air pressure is admitted to the usual triple valve, auxiliary reservoir and brake cylinder, not shown. The train pipe $c$ on the locomotive is connected by the usual connections $c'$ with the train pipe $c^2$ on the car, each car being equipped and connected to the next in the same manner; the whistle signal pipe $d$ is also connected to the air tank $b$ and by the usual connections $d'$ with the signal pipe $d^2$ on the car. The signal pipe may be provided as usual with a reducing valve $e$, an equalizing valve $e'$ and the usual cab signal whistle $e^2$. On the train pipe $c^2$ of each car, at each end thereof, is placed the usual angle cock $c^3$, the signal pipe $d^2$ of each car being likewise provided at each end with a similar angle cock $d^3$. The angle cocks $c^3$ and $d^3$, at the rear end of the rear car of the train, are normally closed, while the others are normally open to permit the free movement of the fluid under pressure.

The improved safety signal device, shown generally at $f$ in Figs. 1 and 2, is interposed in the connection between the train pipe and the signal pipe of the rear car of the train. The device might be made readily removable so as to permit it to be shifted from one car to another, but it is preferable that every car should be permanently equipped with the device, so that any car may be made the rear car. As indicated in Fig. 2, the device $f$ may be conveniently applied between the pipe $c^4$ which connects the conductor's valve $c^5$ with the train pipe $c^2$ and the pipe $d^4$ which connects the whistle signal valve $d^5$ with the signal pipe $d^2$.

The various parts hereinbefore referred to, including the discharge valve $d^5$, but excepting the device $f$, may be of any usual or suitable construction. The novelty of the present invention resides in the construction of the device $f$ and its coöperative relation with the other parts of a fluid pressure system for railway brakes, particularly the engineer's valve $a$, the whistle signal $e^2$ and the train pipe $c$ and signal pipe $d$ with their connections. As shown in Figs. 3 and 5 the train pipe or a branch $c^6$ thereof is suitably connected to a shell or casing $f'$ which has a valve chamber $f^2$, a piston chamber or cylinder $f^3$ and a spring chamber $f^4$ which may have a greater or less capacity as conditions may require. In the chamber or cylinder $f^3$ is disposed a piston $g$ which bears at one side against a suitable spring $h$ and on the other side has a stem $g'$ through which the piston is operatively connected with the slide valve $i$. The piston $g$ and slide valve $i$ are preferably connected with some lost motion or capacity for relative movement so that the piston, in its movements, may more readily overcome the inertia of the valve. To this end the valve $i$ is slotted longitudinally to receive freely the stem $g'$ and it is received loosely between the hub $g^2$ of the piston and a notched plate or disk $g^3$ at the other end of the stem $g'$, the distance between the hub $g^2$ and the plate $g^3$ being slightly greater than the length of the valve $i$ so that the piston acquires movement in either direction before it starts the valve from its position of rest. The walls of the valve chamber $f^2$ limit the movement of the piston in one direction while the internal flange $f^5$ of the spring chamber $f^4$ limits the movement of the piston in the opposite direction.

In the valve seat $f^6$ of the valve chamber $f^2$ are formed ports $f^7$, $f^8$, $f^9$ and $f^{10}$. The port $f^7$ communicates with the atmosphere and forms a vent for the train pipe. The port $f^8$ communicates with the signal pipe $d^2$ or with a branch $d^6$ thereof as hereinafter described. The port $f^9$ communicates with the atmosphere and forms a vent for the signal pipe. The port $f^{10}$ communicates through a channel $f^{11}$ with the piston chamber or cylinder $f^3$ on the opposite side of the piston $g$ to equalize quickly the pressure on opposite sides thereof under certain conditions.

The valve $i$, which is pressed against the valve seat by a suitable spring $i'$, has in its under side a recess or chamber $i^2$ which is adapted, when the valve is in operative or signaling position, to place the signal pipe in communication with the atmosphere through ports $f^8$ and $f^9$. The valve has also a port $i^3$ which communicates through a channel $i^4$ with the piston chamber $f^3$ on the right hand side of the piston and, when the valve is in operative or signaling position, registers with the port $f^{10}$, thereby immediately equalizing the pressure on opposite sides of the piston.

The port $f^8$ of the valve seat $f^6$ communicates with a chamber $k$ through which the signal pipe $d^6$ may be vented when the valve $l$ is moved from its seat. As shown in Fig. 4, the valve rests upon its seat and closes communication between the signal pipe $d^6$ and the chamber $k$. It is held normally to its seat by a spring $l'$ which bears at one end against a cap $f^{12}$ on the casing and at its other end against a piston $l^2$ which is secured to the stem $l^3$ of the valve $l$ and is adapted to move in a piston chamber or cylinder $k^2$ which communicates with the chamber $k$ through a channel $k'$. In the wall of the cylinder $k^2$ is formed a leakage channel or groove $k^3$ which permits the gradual equalization of pressure on opposite sides of the piston, the chamber $k^2$ on the opposite side of the piston being provided with a vent $k^4$. The spindle $l^3$ is provided, outside of the cap $f^{12}$, with a knob $l^4$ or other suitable connection by means of which the valve $l$ may be moved from its seat by hand.

Obviously, when there is no pressure above atmospheric in the chamber $k$, the spring $l'$ holds the valve $l$ to its seat, closing the signal line $d$, $d^6$. Furthermore, when the valve $l$ is in its closed position, regardless of the pressure in the chamber $k$, the pressure on opposite sides of the piston or movable body $l^2$ will be equalized through the leakage groove $k^3$. The valve $l$ will therefore remain in its closed position until it is opened by hand, as by pulling out the knob $l^4$. It will be observed, however, that the leakage groove $k^3$ does not extend throughout the length of the chamber or cylinder $k^2$, to the right, so that as soon as the piston $l^2$ reaches its right hand position, as shown in Fig. 6, it will be held in such position by the fluid pressure in the signal line $d$ so long as the car having the device $f$ is cut in and the signal line is unobstructed, the spring $l'$ being insufficient to overcome the fluid pressure in the signal line. Again, if the signal line should be obstructed or if from any cause the pressure therein is reduced below the proper, operating pressure, the spring $l'$ will restore the valve $l$ to its closed position. The valve $l$ with its projecting stem therefore becomes a visual signal which indicates to the trainman whether the signal system is in working condition and it must be pulled out by the trainman before the engineer can get his test signal showing that the entire brake and signal system is in working condition. Assuming, therefore, that the valve $l$ is in its open position and that the engineer desires to test the brake and signal system, whether the train is running or not, the engineer throws the handle of the engineer's valve at $a$, in the cab, to the full release position for an instant. The high fluid pressure which is thus admitted to the train pipe acts like a hammer blow upon the piston $g$ which is then in the position shown in Fig. 5, and throws it from that position, against the resistance of the spring $h$, to the position shown in Fig. 3. In this movement of the piston or other movable body $g$, the valve $i$ is carried from the position shown in Fig. 5, in which all of the ports $f^7$, $f^8$, $f^9$ and $f^{10}$, are closed, the port $f^8$ being then in communication with the chamber $i^2$, which for the time being is a dead chamber, to the position shown in Fig. 3. In this new position, the port $f^7$, if such a port is provided, is open, permitting the chamber $f^2$ to be vented to the atmosphere and the pressure therein to be reduced. The provision of this port $f^7$, however, is not essential to the operation of the improved device and it may be omitted or provided as conditions may render desirable. By the same movement of the valve $i$ the port $f^8$ is placed in communication with the atmosphere through the chamber $i^2$ and the port $f^9$, thereby permitting an actual reduction of the pressure in the chamber $k$ and therefore of the pressure in the signal line $d$, whereby the cab signal $e^2$ is operated in the usual manner. At the same time also the port $i^3$ moves into registration with the port $f^{10}$, so that the pressure on opposite sides of the piston or movable body $g$ is quickly equalized and the spring $h$ returns the piston or movable body $g$ to its normal or right hand position, so that only a short blast is sounded on the cab signal $e^2$ and the signaling device is returned immediately to its normal or operative position in readiness for another test if necessary.

It will be understood that the trainman opens only the valve $l$ on the rear car of the train and that the corresponding valves of the intermediate cars, being closed automatically by the spring $l'$ when there is no pressure in the chamber $k$, which is the condition until the cars are cut in with the locomotive, are held closed by the springs. The valve $l$ on the rear car is opened by the trainman after the train has been made up and shortly before it starts from the terminal.

Various changes in details of construction and arrangement may be made without departing from the spirit of the invention which is not limited to the particular construction shown and described.

I claim as my invention:

1. A safety signaling device for a fluid pressure brake and signal system comprising a valve mechanism movable by variations of pressure in the train pipe and controlling the pressure in the signal pipe, a valve normally closing the signal pipe and movable by hand to open the same, and means operated by the pressure in the signal pipe to hold said valve in its open position.

2. A safety signaling device for a fluid pressure brake and signal system comprising a chamber communicating with the signal pipe, a valve mechanism movable by variations of pressure in the train pipe and controlling the pressure in said chamber, a valve normally closing the communication between said chamber and the signal pipe and movable by hand to open the same, and means operated by the pressure in said chamber to hold said valve in its open position.

3. A safety signaling device for a fluid pressure brake and signal system comprising a chamber communicating with the train pipe, a piston movable therein under variations of pressure in the train pipe, said chamber having a by-pass adapted to communicate therewith on opposite sides of the piston, and a valve movable with said piston, said valve controlling the pressure in the signal pipe and controlling also said by-pass.

4. A safety signaling device for a fluid pressure brake and signal system comprising a casing for a chamber communicating with the train pipe and a chamber communicating with the signal pipe, a piston movable in said first named chamber under variations of pressure in the train pipe, said casing having a by-pass adapted to communicate with said first named chamber on opposite sides of said piston, and a valve movable with said piston, said valve controlling the pressure in the signal pipe and controlling said by-pass.

5. A safety signaling device for a fluid pressure brake and signal system comprising a casing having a chamber communicating with the train pipe with a by-pass adapted to communicate therewith on opposite sides of the piston therein, and a chamber communicating with the signal pipe and adapted to communicate with the atmosphere, a piston movable in said first named chamber under variations of pressure in the train pipe, and a valve movable with said piston to control said by-pass and to control the communication between the second named chamber and the atmosphere.

6. A safety signaling device for a fluid pressure brake and signal system comprising a casing having a chamber communicating with the train pipe, a by-pass communicating with opposite ends of said chamber, a second chamber communicating with the signal pipe and a valve seat having a port communicating with said by-pass, a port communicating with the atmosphere and a port communicating with said second named chamber, a piston movable in said first named chamber under variations of pressure in the train pipe, and a valve movable with said piston and having a port and channel to place said by-pass in communication with the first named chamber and a channel to place the second named chamber in communication with the atmosphere.

7. A safety signaling device for a fluid pressure brake and signal system comprising a casing having a chamber communicating with the train pipe, a by-pass communicating with opposite ends of said chamber, a second chamber communicating with the signal pipe and a valve seat having a port communicating with said by-pass, a port communicating with the atmosphere, a port communicating with said second named chamber and a second port communicating with the atmosphere, a piston movable in said first named chamber under variations of pressure in the train pipe, and a valve movable with said piston and having a port and channel to place said by-pass in communication with the first named chamber and a channel to place said second named chamber in communication with the atmosphere and adapted to place said first named chamber in communication with the atmosphere through said second named port communicating with the atmosphere.

8. A safety signaling device for a fluid pressure brake and signal system comprising a valve mechanism movable by variations of pressure in the train pipe and controlling the pressure in the signal pipe, a valve normally closing the signal pipe and movable by hand to open the same, a spring tending to close said valve and a piston operatively connected with said valve and subject to the pressure in the signal pipe when the valve is open.

9. A safety signaling device for a fluid pressure brake and signal system comprising a casing having a chamber communicating with the train pipe, a second chamber communicating with the signal pipe and a third chamber communicating with the second chamber, a valve mechanism in the first named chamber and movable by variations of pressure in the train pipe to control the pressure in the second named chamber, a valve to control the communication between the signal pipe and the second chamber, a spring tending to close said valve, a piston in the third chamber and connected with the valve, and means to open said valve by hand.

10. A safety signaling device for a fluid pressure brake and signal system comprising a casing having a chamber communicating with the train pipe, a second chamber communicating with the signal pipe and a third chamber communicating with the second chamber, a valve mechanism in the first named chamber and movable by variations of pressure in the train pipe to control the pressure in the second named chamber, a valve to control the communication between the signal pipe and the second chamber, a spring tending to close said valve, a piston in the third chamber and connected with the valve, and means to open said valve by hand, said third chamber having a leakage groove for a portion of the length of travel of the piston, whereby when the valve is closed the pressure is equalized on opposite sides of the piston and when the valve is opened it is held open by signal pipe pressure upon one side of the piston.

This specification signed and witnessed this 1st day of July, A. D., 1910.

WILLIAM H. SAUVAGE.

Signed in the presence of—
  AMBROSE L. O'SHEA,
  ELLA J. KRUGER.

---

Copies of this patent may be obtained for five cents each, by addressing the "Commissioner of Patents, Washington, D. C."